Figure 1:
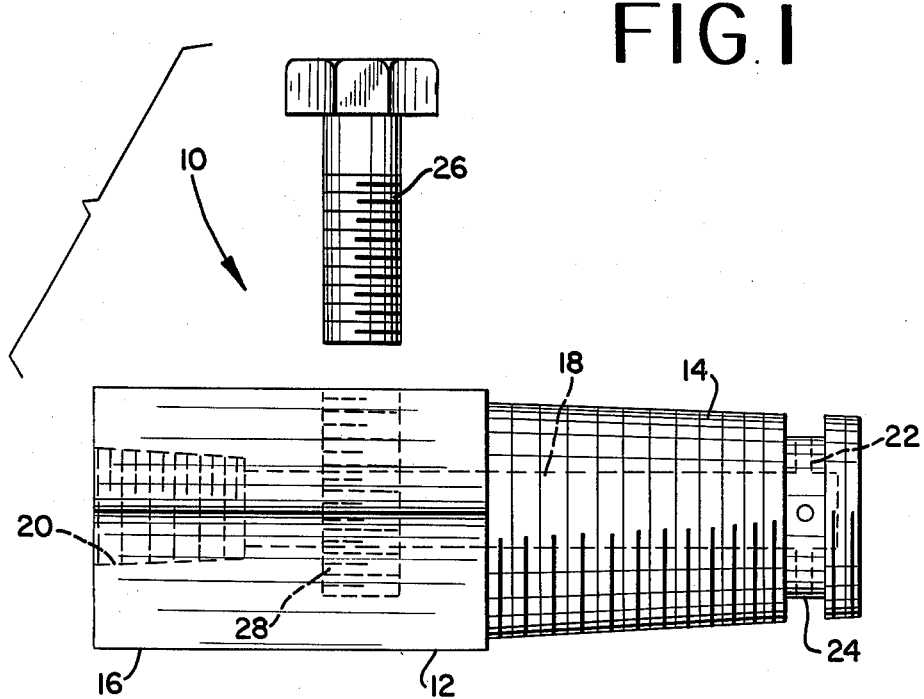

United States Patent [19]
Adams

[11] 4,165,080
[45] Aug. 21, 1979

[54] PACKING SEALER PLUG

[76] Inventor: Harold R. Adams, Rte. 1, St. Francisville, Ill. 62460

[21] Appl. No.: 910,133

[22] Filed: May 26, 1978

[51] Int. Cl.² .................... F16L 55/10; F16J 15/40
[52] U.S. Cl. ........................ 277/72 FM; 277/129; 138/99; 285/15; 285/363
[58] Field of Search ............ 239/567; 277/72 FM, 277/126, 226, 1, 129; 222/390; 138/97–99; 118/307; 285/96, 97, 15, 94, 294, 297, 363, 373

[56] References Cited

U.S. PATENT DOCUMENTS

| | | | |
|---|---|---|---|
| 1,285,430 | 11/1918 | Sheppy | 277/1 X |
| 1,677,486 | 7/1928 | Nelson | 239/567 X |
| 1,954,454 | 4/1934 | McFarland | 277/21 |
| 3,467,141 | 9/1969 | Smith | 285/292 X |
| 3,550,638 | 12/1970 | Smith | 285/373 X |
| 3,770,301 | 11/1973 | Adams | 222/390 X |
| 3,907,442 | 9/1975 | Reid | 277/72 FM X |

FOREIGN PATENT DOCUMENTS

| | | | |
|---|---|---|---|
| 186931 | 9/1956 | Austria | 138/99 |
| 825916 | 12/1951 | Fed. Rep. of Germany | 239/567 |

*Primary Examiner*—Robert S. Ward, Jr.
*Attorney, Agent, or Firm*—Glenn K. Robbins

[57] ABSTRACT

A packing sealer plug for use with valve flanges or the like. The packing sealer plug is adapted to be used in tapped openings leading to the interface between the valve flanges or other types of fittings in which packing is to be introduced by a high pressure packing gun. The plug is comprised of an externally threaded end insertable in the opening and an axial passage way leading to an opposite end of the plug which has a threaded opening adapted to receive a nozzle of the packing gun or the like for introduction of the packing. The end of the plug adjacent the threaded opening has a hexagonal square or circular exterior for reception of a wrench for connecting the plug to the flange opening. A cut-off passage way intersects with the axial passage way radially and is threaded to receive a cut-off bolt to seal the plug. The externally threaded end of the plug has a solid end with a circumferential groove adjacent to it and radial ports communicating with the axial passage way in order that packing can be expelled through the ports and the grooves substantially 360 degrees around the plug to insure even distribution of the packing.

2 Claims, 2 Drawing Figures

U.S. Patent

Aug. 21, 1979

4,165,080

PACKING SEALER PLUG

SUMMARY OF THE INVENTION

In the past there has been a problem to provide packing expeditiously and efficiently to large pipe line flanges and the like to provide for sealing and prevent leakage and blow-out at the flange interfaces. Packing is also employed in various other types of fluid handling lines as will be well understood in the art. For high pressure of several thousand pounds per square inch and the packing must be for best efficiency be introduced uniformly and with a minimum of difficulty by operators and maintenance men working in all types of conditions at various types of installations.

By means of this invention there has been provided a simple packing sealer plug which can be utilized in any tapped opening communicating with an area in which packing is to be introduced. The plug is simple in construction and can be readily installed and left in the fitting after introduction for the packing with means for completely sealing the plug. The plug is simple in construction and with the use of a standard wrench can be simply connected as desired in any tapped opening. The plug can be made of different sizes for different tapped openings as desired.

The plug is specially designed for introduction of packing in the 360 degree fashion around the opening in which the plug is employed to insure uniform distribution of the packing and to minimize channelling or the like. Further through the special construction clogging or plugging of the ports is minimized by the distribution through the radial ports and a circumferential recessed protective groove adjacent the plug end.

The plug is simply constructed of an elongated body having an externally threaded first end which can be readily fitted in the threaded or tapped opening in which the plug is employed. The opposite end is of a hexagonal square or circular exterior in order that it may be gripped by a conventional wrench and connected in the threaded opening of the pipe flange or the like in which the plug is employed.

The plug is provided with an axial central passage way extending from the hexagonal end of the body to adjacent the threaded end but not extending through it such that the end is left solid and closed. The hexagonal end is further provided with a threaded opening in order that a threaded nozzle of a packing gun or high pressure packing line may be introduced for supplying the packing to the plug.

Adjacent the threaded end radial ports communicate with a circumferential groove extending completely around the plug but spaced a slight distance from the end to provide for protection for the interior of the groove. The packing is expelled through the radial ports and around the groove to provide for substantially 360 degree radial distribution of the packing.

When the packing is completely introduced a cut-off or sealing means is provided through a radial threaded opening intersecting with the axial passage way and which receives a cut-off bolt. The bolt when fully threaded into the radial opening cuts off the axial passage way to seal it and allow for removal of the packing gun without loss of pressure in the threaded end of the plug or the interior of the pipe line flange wherein the packing is introduced.

The plug is simple in construction and can be readily used at substantially minimal expense by workmen in the field. The plug is rugged and is adapted for use for many types of pipe line flanges and other types of fluid handling installations where sealing between fittings is desired.

The above features are objects of this invention and further object will appear in the detailed description which follows and will be otherwise apparent to those skilled in the art.

For purpose of illustration of this invention there is shown in the accompanying drawings a preferred embodiment thereof. It is to be understood that these drawings are for the purpose of illustration only and that the invention is not limited thereto.

IN THE DRAWINGS

Figure 2:
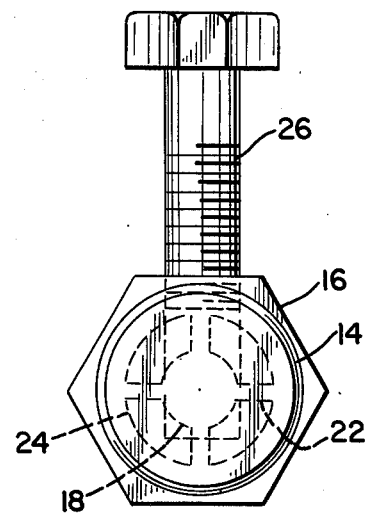

FIG. 1, is a top plan view of the plug showing the passage ways in dotted lines; and FIG. 2, is a view in side elevation taken from the right side of FIG. 2 of the plug.

DESCRIPTION OF THE INVENTION

The plug is generally identified by the reference numeral 10 in FIGS. 1 and 2. It is comprised of a plug body 12 having at one end the threaded exterior 14 and at the opposite end a hexagonal square of circular exterior 16 for the reception of a wrench or the like. Through the threaded exterior 14 the plug can be inserted in a tapped flange opening or other types of tapped fitting for introduction of packing under high pressure. The plug is further provided with an axial passage way 18 communicating with the hexagonal square or circular wrench end of the plug at one end and terminating adjacent to and just short of the threaded end.

The hexagonal square or circular end of the plug is further provided with an enlarged threaded opening 20 for the connection of a threaded nozzle of a packing gun or other line for introduction of packing under high pressure.

The threaded end 14 is provided with four radial ports 22 connecting the axial passage way to a recessed circumferential groove 24 situated adjacent the end of the treaded end 14. This circumferential groove provides for protection of the end of the radial ports 22 to prevent their being fouled or jammed by physical contact inside the flange. Further the radial ports provided for expulsion of the packing at 90 degree intervals around the plug and substantially 360 degrees around the plug around the groove to minimize channelling in the interior of the pipe flange or other fitting which receives the packing.

In order to seal off the axial passage way 18 after the packing has been introduced and to permit removal of the packing gun a passage way cut-off bolt 26 which is provided. This is comprised of a cut-off bolt 26 which is threaded and which is receivable within a threaded radial passage way 28 intersecting with and adapted to cut off the axial passage way. The bolt 26 when fully threaded in the opening 28 cuts off the axial passage way and permits the removal of the packing gun. During introduction of the packing the bolt 26 is backed off to clear the passage way but is left in the body to prevent leakage through the passage way 28.

Use

The packing sealer plug of this invention is adapted for very simple employment in any type of threaded opening in a pipe line flange or other type of fitting where packing is introduced. The plug is simply threaded into the fitting when the packing is to be introduced and the cut-off bolt 26 is backed off to clear the axial passage way. The packing gun is then connected to the threaded opening 20 by insertion of the nozzle of the gun. The packing is then introduced under high pressure and flows through the axial passage way and out the radial ports 22 and through the circumferential groove 24 to the area where packing is to be employed. The groove not only provides for packing introduction around the plug but also protects the ends of the radial ports to prevent their beind fouled or damaged by physical contact. The end of the plug at the threaded end 14 further provides a protective means to prevent this end from being fouled should the plug be threaded in so far that it hits a structual surface of the flange or other fitting in which it is used.

When the packing has been completely introduced the cut-off bolt 26 is threaded into the passage way 28 to block the axial passage way 18. This seals the packing inside the passage way and prevents any pressure reduction or packing escape through the threaded opening 20 when the gun is removed.

At the conclusion of the operation the packing and sealer plug can simply be left in the threaded fitting. When it is desired to be used for introduction of additional packing the aforementioned descriptive operation is simply repeated as often as required.

Various changes and modifications may be made within this invention as will be readily apparent to those skilled in the art. Such changes and modifications are within the scope and teaching of this invention as defined by the claims appended hereto.

What is claimed is:

1. A packing and sealer plug for entry of packing into a fitting and sealing the same, said plug comprised of a body having an externally threaded portion at one end adapted to engage an internally threaded fitting, said plug having an internally threaded opening at a second end adapted to receive a threaded nozzle of a packing gun or the like for admission of packing thereto, a passageway connecting said internally threaded opening with radial ports at the end of said externally threaded portion, said externally threaded end portion being provided with an external circumferential groove communicating with said radial ports for distribution of said packing uniformly around the end portion of said plug.

2. The packing and sealer of claim 1, in which means are provided for sealing said passageway, said means comprising a second threaded passageway intersecting said first named passageway and extending through a side of the plug, said second passageway receiving a threaded member moveable in said second passageway into and out of sealing engagement with said first named passageway.

* * * * *